(12) United States Patent
Padgett et al.

(10) Patent No.: US 8,745,520 B2
(45) Date of Patent: Jun. 3, 2014

(54) USER INTERFACE INCLUDING A PREVIEW

(75) Inventors: Allan P. Padgett, Seattle, WA (US); Johnnie B. Manzari, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 2886 days.

(21) Appl. No.: 10/839,965

(22) Filed: May 5, 2004

(65) Prior Publication Data
US 2005/0251754 A1 Nov. 10, 2005

(51) Int. Cl.
*G06F 3/00* (2006.01)
*G06F 3/048* (2013.01)
*G06F 3/0481* (2013.01)
*G06F 9/44* (2006.01)
*G06F 3/0484* (2013.01)

(52) U.S. Cl.
CPC .......... *G06F 3/04817* (2013.01); *G06F 9/4443* (2013.01); *G06F 3/04842* (2013.01); *Y10S 715/965* (2013.01); *Y10S 715/966* (2013.01)
USPC ............ 715/779; 715/790; 715/965; 715/966

(58) Field of Classification Search
CPC  G06F 9/4443; G06F 3/04817; G06F 3/04842
USPC .................................. 715/966, 965, 790, 779
See application file for complete search history.

(56) References Cited

U.S. PATENT DOCUMENTS

| | | | | |
|---|---|---|---|---|
| 4,746,919 A | * | 5/1988 | Reitmeier ................ | 340/825.56 |
| 5,524,195 A | * | 6/1996 | Clanton et al. .................. | 725/61 |
| 5,963,916 A | * | 10/1999 | Kaplan .......................... | 705/26 |
| 7,096,432 B2 | * | 8/2006 | Huapaya et al. .............. | 715/863 |
| 2005/0034338 A1 | * | 2/2005 | Footman ........................ | 40/107 |

* cited by examiner

*Primary Examiner* — Boris Pesin
*Assistant Examiner* — Sabrina Greene
(74) *Attorney, Agent, or Firm* — Schwegman Lundberg & Woessner, P.A.

(57) ABSTRACT

Methods and apparatus, including computer program products, for providing content previews. One apparatus operates to display one or more user interface controls as a foreground against a background on a display device; receive user input resulting in a user interface state that has an associated action; and display as the background a preview of the associated action. In another aspect, the user input gives focus to a user interface control that has associated content; and a preview of the associated content is displayed without further action on the part of the user. In another aspect, user interface controls are displayed; and giving input focus to a particular user interface control that has associated content causes an apparatus to play a preview of the associated content without further action on the part of a user.

31 Claims, 4 Drawing Sheets

USER INTERFACE INCLUDING A PREVIEW

BACKGROUND

The present invention relates to presenting preview information in connection with the operation of a user interface.

Users commonly interact with computers, computer program applications, consumer electronics, home electronics, or other devices or equipment using user interface (UI) controls. User interaction with the UI controls can include shifting input focus between or among the UI controls as the user navigates the UI controls. The user selects a UI control by shifting input focus to that UI control. Some UI controls have associated commands that determine the action to be performed when the user activates the UI control. Shifting input focus to a UI control that has associated commands does not result in the execution of the associated commands. Typically the user must take some further action, e.g., press the ENTER key, to execute the associated commands for a UI control after the UI control has input focus. The action to be performed when the user activates a UI control can also be determined by a sequence of user interactions with the UI controls. This is generally true for UI controls on consumer electronics devices, such as televisions with remote controls or mobile telephones, which are not commonly thought of as having or running computer programs.

SUMMARY OF THE INVENTION

The present invention provides methods and apparatus, including computer program products, that implement techniques for providing preview information about content or actions to a user.

In general, in one aspect, one or more user interface controls are displayed to appear as a foreground against a background on a display device so that a user can interact with them; user input is received resulting in a user interface state, which has an associated action; and a preview of the associated action is displayed as the background.

Implementations of the invention can include one or more of the following advantageous features. The user interface controls are displayed on a television monitor or display, a computer monitor or display, a mobile phone screen, or other device. The user interface controls include user interface controls for a print dialog; the user input includes user input resulting in a user interface state having an associated print action; and the preview is a preview of the associated print action. The preview is rendered as transparent or partially transparent in places where the user interface controls are displayed. The display device has a display area and the background extends over the entire display area, or, alternatively, over a majority of the entire display area, independent of any application boundary. The associated action is the playing of audio content, which has associated visual content; and a portion of the audio content is played while the visual content is displayed as the background. The audio content is content from a music compact disc and the visual content is a reproduction of cover art of the compact disc. The associated action is the playing of video content; and a portion of the video content is played as the background, or, alternatively, a still image extracted from the video content is displayed as the background.

In general, in another aspect, one or more user interface controls are displayed to appear as a foreground against a background on a display device, the user interface controls are displayed so that a user can interact with them; user input is received to give input focus to a first user interface control of the user interface controls, which has associated content; and a preview of the associated content is displayed as the background without further action on the part of the user.

Implementations of the invention can include one or more of the following advantageous features. The user interface controls include a calendar view user interface control, the calendar view control including one or more date user interface controls; the instructions for receiving user input include instructions to receive user input at the calendar view control, the user input specifying an image in an image database associated with the calendar view control; and the instructions for displaying the preview include instructions to display as the background a preview of the specified image. User input selecting a specified image is received, and the specified image is selected for subsequent operations. The subsequent operations can be operations to print the specified image, edit the specified image, or transmit the specified image.

In general, in another aspect, one or more user interface controls are displayed; and an input device is provided to receive a first user input giving input focus to a first user interface control, which has associated content, and as a consequence a preview of the associated content is played without further action on the part of the user.

Implementations of the invention can include one or more of the following advantageous features. The input device includes a hand-held remote control device and a receiver operable to receive signals from the remote control device and in response to the signals control operation of the system. The input device is operable to receive a second user input that activates the first user interface control and thereby causes the system to play the associated content. The associated content is audio content and playing a preview of the associated content includes playing an audio clip. The audio clip is played at a lower than normal volume. The associated content is video content and the preview of the associated content is an image from the video clip displayed as a still image, or, alternatively, it is a video clip. The video clip and the user interface controls are displayed on a single display device. The video clip is displayed on one device, e.g., a television monitor, and the user interface controls are displayed on a separate device, e.g., a remote control. The video preview is displayed at a lower than normal brightness or contrast or both.

The invention can be implemented to realize one or more of the following advantages. Displaying the preview of the associated action as the background results in a larger preview image as compared to displaying the preview in a preview pane that is part of the user interface. The user interface can be displayed on a display device having a limited display area. Displaying a preview of the associated action in the background enables the implementation of a more intuitive user interface. The user can interact with the user interface by manipulating a cursor using a pointing device, where the preview displays the action associated with a UI control as the user hovers over the UI control with the cursor. The user interface can be used for content selection and the preview can display an image associated with the content to be selected. The calendar view UI control provides a larger view of the image for a user-specified day without obscuring the calendar view UI control. The print dialog provides a larger view of the print action to be performed without obscuring the UI controls in the print dialog. One implementation of the invention provides all of the above advantages.

Details of one or more implementations of the invention are set forth in the accompanying drawings and in the descrip-

BRIEF DESCRIPTION OF THE DRAWINGS

Like reference numbers and designations in the various drawings indicate like elements.

DETAILED DESCRIPTION

Figure 1:
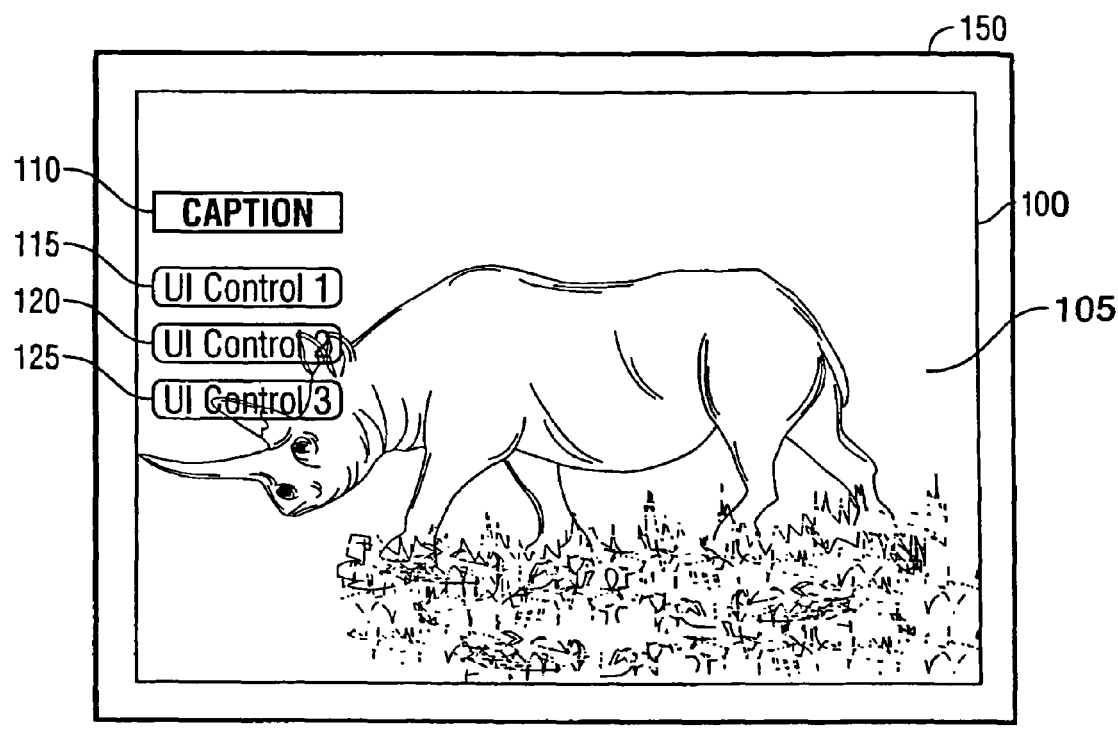
FIG. 1 illustrates a user interface in accordance with the invention.

FIG. 1 illustrates one implementation of a user interface in accordance with the invention. The user interface 100 displays a foreground against a background on a display device 150, where the background can be used to display a background image 105. The user interface 100 can be displayed on the entire display area of the display device 150 or it can be displayed on only a portion of the display area.

In one implementation, the appearance of the foreground on the background can be controlled, e.g., the foreground and the background can be displayed as being transparent, opaque, or partially transparent. In the illustrated implementation, the user interface 100 is configured so that the foreground appears to be layered over the background, with the foreground being partially transparent so that the background shows through to some extent. This can be done by making either the foreground or the background partially transparent and layered over the other where the foreground overlaps the background.

The user interface 100 includes one or more user interface (UI) controls, such as a caption UI control 110, UI_control_1 115, UI_control_2 120, and UI_control_3 125. The UI controls are displayed using a transparency mask so that both the background image 105 and the UI controls are visible. The UI controls are displayed to allow a user to use the controls to interact with a computer program or an electronic device using the UI controls. User interaction with the UI controls results in a UI state. The UI state in some cases will have an associated action that will be performed upon user activation, e.g., as a result of the user pressing the ENTER key on a keyboard, a mobile telephone, or a television remote control, or pressing a button on a computer mouse. A preview of the associated action is displayed as the background image 105. If the UI state does not have an associated action, a default image associated with the UI state is displayed as the preview. As the UI state is modified as a result of user interaction with the UI controls, the background image 105 changes to display the preview associated with the modified UI state. In one implementation, the preview associated with the modified UI state is displayed after a predetermined delay interval has elapsed since the last modification of the UI state.

In one implementation, the UI control currently having input focus is indicated visually, e.g., by an opaque rectangle surrounding the UI control or by a partially transparent rectangle, e.g., a partially transparent off-white rectangle through which the background image is visible. Optionally, a darkening filter is applied to the background image 105 to make it darker in regions of the background where a UI control is not displayed, or a lightening filter is applied to the background image 105 to make it appear lighter in regions of the background where a UI control is not displayed, or the contrast of the background image 105 is reduced. Other optional features include displaying the background image after colorizing the background image, e.g., the displayed background image can be sepia toned.

The user interacts with the UI controls using the available user interface devices. With some UI devices, the user brings up UI controls and navigates among them by using cursor keys and special input keys. In such environments, one control will generally be highlighted and will be activated when a select button or the like is pressed. A television remote control typically provides such an environment. In other environments, a free-floating cursor can be manipulated freely over a display area, for example by manipulating a pointing device such as a mouse. Such a cursor can be made to float over a displayed UI control, and the operational semantics of the environment are that when, for example, a mouse button is clicked, the control is selected or activated. To cover all cases concisely, this specification refers to a UI control as having input focus when the UI control is under a floating cursor, as just described, or has been selected without being activated, or is otherwise recognized as the control that would be given effect when a user input indicating activation is received. In one implementation, when a UI control has focus and an associated action, the background image 105 changes to display a preview of the action associated with the UI control.

In another implementation, the UI controls displayed in the user interface 100 have associated content and the user interacts with the UI controls to select the associated content. The content can be text, graphics, images, audio, video, or any other type of content. The content associated with a UI control can have an associated preview image, in which case the associated preview image is displayed as the background image 105 when the UI control has input focus. The preview image can be any image or sequence of images that represents the content, e.g., a first image from a slide show, an album cover for an audio file, or a video clip for a video file. In one example, the UI controls 115, 120, and 125 are each associated with a video clip. If one of the UI controls has input focus, e.g., UI control 115, a preview of the video clip associated with the video clip is displayed as the background image 105. The preview of the video clip can be a segment of the video clip, text describing the content of the video clip, a still image representing the video clip, or a slide show that shows different frames of the video clip. The preview is displayed without further action by the user, but the video clip is displayed only after the user activates the UI control 115.

Figure 2B:
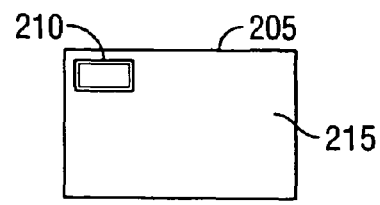
FIG. 2B illustrates a date user interface control.
Figure 2A:
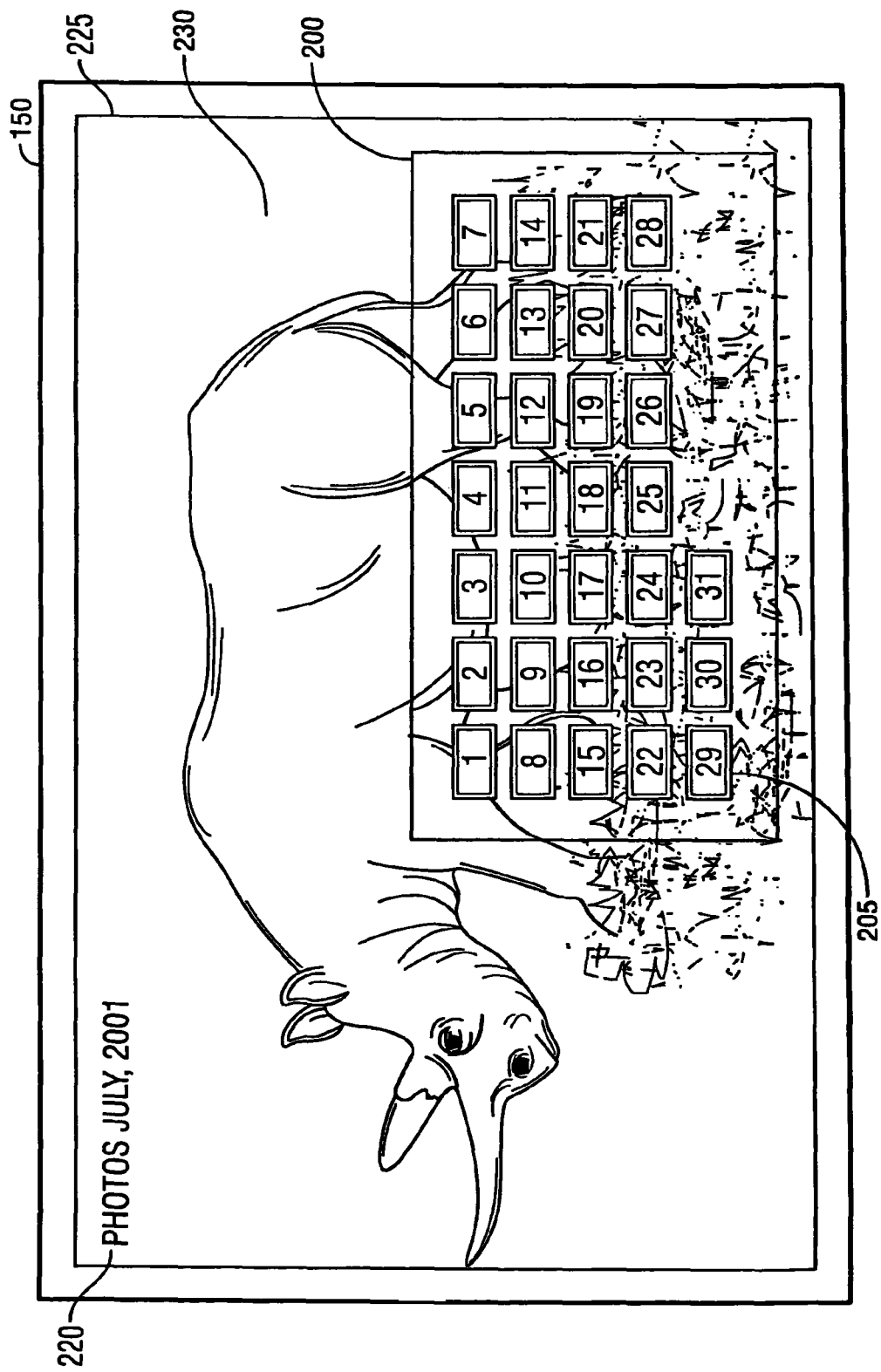
FIG. 2A illustrates a user interface including a calendar view user interface control.

FIG. 2A illustrates a user interface 225 including a calendar view UI control 200. The calendar view user interface is displayed to appear in the foreground against the background image 230 displayed on the display device 150. The calendar view UI control 200 includes one or more date UI controls, e.g., control 205, where each date UI control displays a corresponding date. As illustrated in FIG. 2B, in one implementation, each date UI control displays a numeric date value 210 for the corresponding date and a thumbnail 215 of an image associated with the corresponding date. The calendar view UI control 200 can be used to select or operate on one or more images, where each image corresponds to a date displayed in the date UI controls. Each date UI control displays an image corresponding to the date displayed in the date UI control as the thumbnail 215. If no image corresponds to the date, a transparent rectangle or a default image is displayed in place of the thumbnail 215.

The calendar view UI control can be used by a user to interact with an image database where each image has a corresponding date. This date can be the date the image was captured (e.g., photographed), the date the image was inserted in the image database, or some other date associated with the image. For example, in the illustrated state of the illustrated implementation, the application user interface 225 is used to interact with all the images available in the image database for the month of July, 2001, indicated by the caption UI element 220, i.e., "PHOTOS: July, 2001". In addition, the displayed calendar view UI control 200 includes a date UI control for each day in the month of July 2001. If there is only one image in the image database associated with the date displayed in a date UI control, the associated image is displayed as the thumbnail 215. If there is more than one such image, a predetermined or random image is selected and displayed as the thumbnail 215, e.g., an image having an earliest time-stamp for the displayed date. Alternatively, a slide show of all the images for the date displayed in the date UI control is displayed in the thumbnail 215, where the slide show is either automatic or controlled by the user.

The user interacts with the calendar view UI control 200 by navigating among the date UI controls. The UI state can be the date corresponding to the date UI control currently having input focus. The action associated with the date UI control can be a selection of the associated image for subsequent operations, including printing, editing, or transmitting the image. In one implementation, as the user interacts with the calendar view UI control 200, the background image 230 is updated to display the associated image for the date UI control currently having input focus. In an alternative implementation, the user must activate the date UI control currently having input focus to display the associated image for the date UI control as the background image 230.

Figure 3:
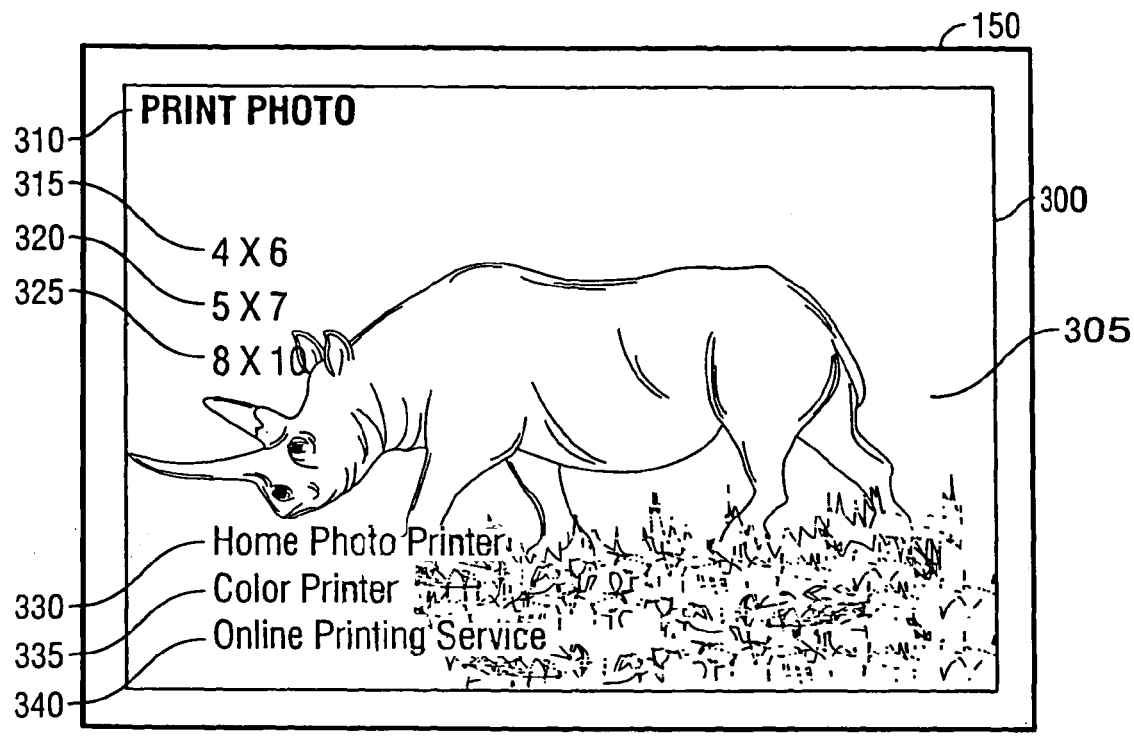
FIG. 3 illustrates a print dialog user interface.

FIG. 3 illustrates a print dialog user interface 300 in accordance with the invention. The print dialog 300 displays UI controls in the foreground against the background of the display device 150. The user interacts with the UI controls to specify a print action to be performed, and a preview of the specified action is displayed as the background image 305. The user interface controls displayed by the print dialog 300 include a caption, "PRINT PHOTO" 310 and one or more size selections, i.e., "4×6" 315, "5×7" 320, and "8×10" 325. In addition, the print dialog 300 includes UI controls displaying the available printers to print the selected image, i.e., "Home Photo Printer" 330, "Color Printer" 335, and "Online Printing service" 340. The preview of the selected print operation associated with the current UI state is displayed as a background image 305 in the background as the user navigates through the user interface controls. For example, if the user navigates to the user interface control "home photo printer" 330, and the associated printer for this user interface control is a black and white printer, a black and white version of the image is displayed as the background image 305. Optionally, the print dialog 300 can include UI controls that can be used by the print user to specify a cropped image, and a preview of the user specified cropped image is displayed as the background image 305.

Figure 4:
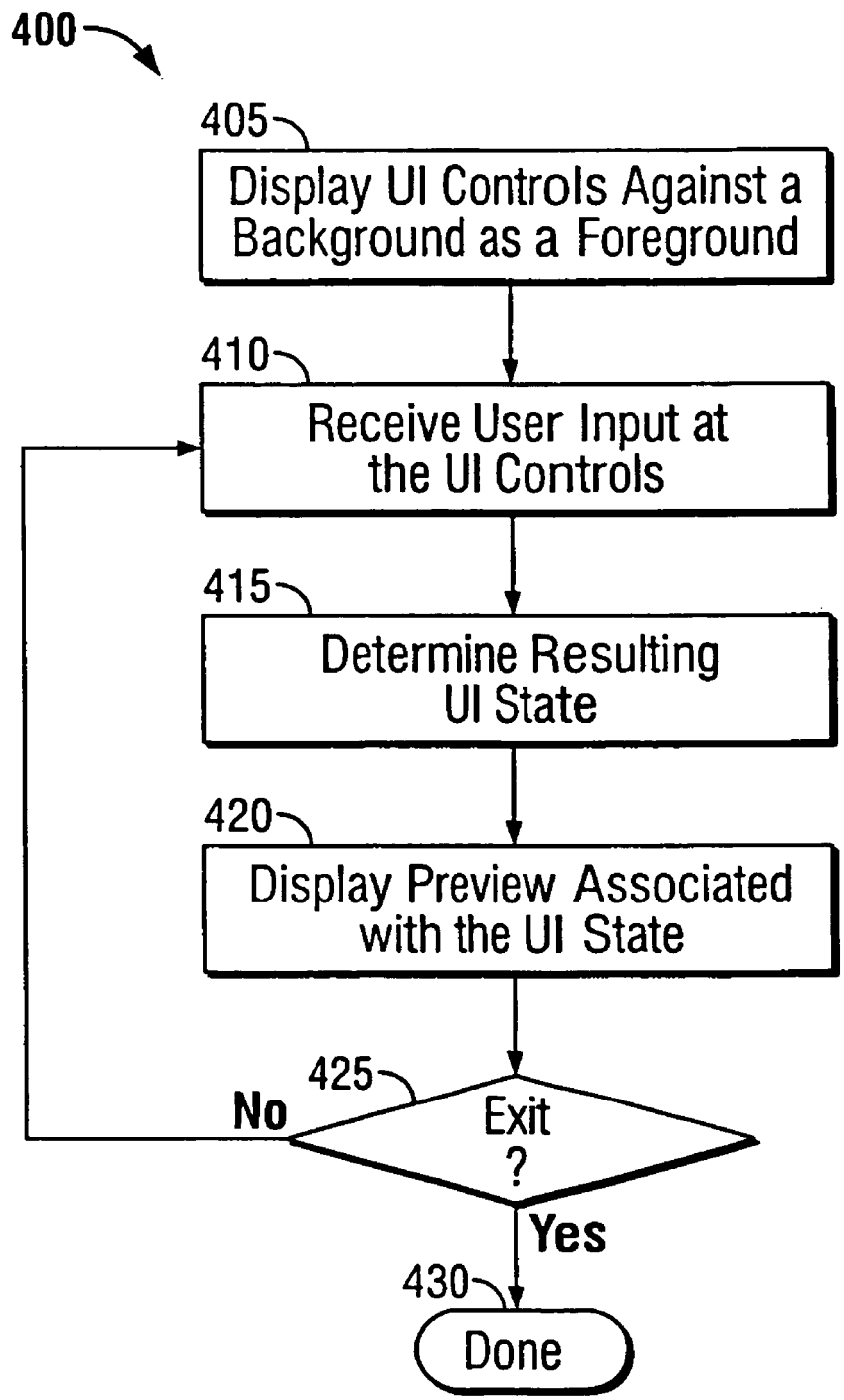
FIG. 4 is a flow diagram illustrating a method for displaying a preview of the action associated with the user interface state as the background image.

FIG. 4 illustrates a method 400 for displaying a preview of the action associated with the user interface state as the background image. UI controls are displayed as a foreground against a background (step 405). User input is received at or relative to the UI controls (step 410), and the UI state resulting from the user input is determined (step 415). A preview of the action associated with the UI state is displayed as a background image (step 420). In an alternative implementation, the UI state includes the property that a particular UI control has input focus, and a preview of content associated with the particular UI control is displayed or played without further user action. The method 400 continues ("no" branch from decision step 425) until user input is received indicating an exit from the navigation of the UI controls, e.g., a user input making a final selection ("yes" branch from decision step 425 to "done" 430). Optionally, there is a predefined delay or a user-selected delay between step 415 and step 420, such that the preview is displayed only after the delay time has lapsed.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network, including an embedded computer or processor controlling an electronic device, including a consumer electronic device, including by way of example, a television, a video recorder, a personal digital assistant, or a mobile telephone.

The processes and logic flows described herein, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. The display device can include a television screen, a mobile phone, and the user can provide input using a cursor that is controlled by a remote control device.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments, but other embodiments can be implemented and are within the scope of the following claims. For example, the operations of the invention can be performed in a different order and still achieve desirable results. In certain implementations, multitasking and parallel processing may be preferable. Other embodiments are within the scope of the following claims.

What is claimed is:

1. A computer program product, tangibly embodied in a memory of a data processing apparatus, comprising instructions operable to cause the data processing apparatus to:
   display one or more user interface controls, the user interface controls being displayed to appear as a foreground layered over a background on a display device, the user interface controls being displayed for user interaction;
   receive user input at the user interface controls, the user input resulting in an associated action, the associated action having corresponding visual content; and
   display as the background a preview of the associated action by displaying the visual content in the background with the user interface controls being displayed to appear as the foreground layered over the background.

2. The computer program product of claim 1, wherein the user interface controls are displayed on a television display, a computer monitor, or a mobile phone screen.

3. The computer program product of claim 1, wherein:
   the user interface controls comprise user interface controls for a print dialog;
   the user input comprises user input resulting in a user interface state having an associated print action; and
   the preview is a preview of the associated print action.

4. The computer program product of claim 1, wherein the instructions to display the preview as the background comprise instructions to render the preview transparent or partially transparent in places where the user interface controls are displayed.

5. The computer program product of claim 1, wherein the display device has a display area and the background extends over the entire display area.

6. The computer program product of claim 1, wherein the display device has a display area and the background extends over a majority of the entire display area, independent of any application boundary.

7. The computer program product of claim 1, wherein the associated action is the playing of audio content, the audio content having associated visual content, the product further comprising instructions to play a portion of the audio content and display as the background the visual content.

8. The computer program product of claim 7, wherein the audio content is content from a music compact disc and the visual content is a reproduction of cover art of the compact disc.

9. The computer program product of claim 1, wherein the associated action is the playing of video content, the product further comprising instructions to play a portion of the video content as the background.

10. The computer program product of claim 1, wherein the associated action is the playing of video content, the product further comprising instructions to display a still image extracted from the video content as the background.

11. The computer program product of claim 1, wherein:
    the user interface controls comprise a calendar view user interface control, the calendar view control including one or more date user interface controls;
    the instructions to receive user input comprise instructions to receive user input at the calendar view control, the user input specifying an image in an image database associated with the calendar view control; and
    the instructions to display the preview comprise instructions to display as the background a preview of the specified image.

12. The computer program product of claim 11, further comprising instructions to:
    receive user input selecting a specified image; and
    select the specified image for subsequent operations.

13. The computer program product of claim 12, wherein the instructions to select the specified image for subsequent operations comprise instructions to:
    print the specified image, edit the specified image, or transmit the specified image.

14. A computer program product, tangibly embodied in a memory of a data processing apparatus, comprising instructions operable to cause the data processing apparatus to:
    display one or more user interface controls, the user interface controls being displayed to appear as a foreground layered over a background on a display device, the user interface controls being displayed for user interaction;
    receive user input to give input focus to a first user interface control of the user interface controls, the first user interface control having associated content; and
    display as the background a visual preview of the associated content without further action on the part of the user, the user interface controls being displayed to appear as a foreground layered over the background.

15. The computer program product of claim 14, wherein the user interface controls are displayed on a television display, a computer monitor, or a mobile phone screen.

16. The computer program product of claim 14, wherein the instructions to display the preview as the background comprise instructions to render the preview transparent or partially transparent in places where the user interface controls are displayed.

17. The computer program product of claim 14, wherein the display device has a display area and the background extends over the entire display area.

18. The computer program product of claim 14, wherein the display device has a display area and the background extends over a majority of the entire display area, independent of any application boundary.

19. The computer program product of claim 14, wherein the associated content is video content and the preview is a portion of the video content.

20. The computer program product of claim 14, wherein the associated content is video content and the preview is a still image extracted from the video content.

21. The computer program product of claim 14, wherein:
the user interface controls comprise a calendar view user interface control, the calendar view control including one or more date user interface controls;
the instructions to receive user input comprise instructions to receive user input at the calendar view control, the user input specifying an image in an image database associated with the calendar view control; and
the instructions to display the preview comprise instructions to display as the background a preview of the specified image.

22. A system comprising:
a display apparatus displaying one or more user interface controls layered over a background; and
an input device operable to receive a first user input identifying a first user interface control of the user interface controls, the first user interface control having associated content, the display apparatus adapted to, as a consequence of receiving the first user input, display a visual preview of the associated content in the background with the user interface controls layered over the background.

23. The system of claim 22, wherein the input device comprises a hand-held remote control device and a receiver operable to receive signals from the remote control device and in response to the signals control operation of the system.

24. The system of claim 22, wherein the input device is further operable to receive a second user input that activates the first user interface control and the system is adapted, in response to the second user input, to display the associated content.

25. The system of claim 22, wherein the associated content includes audio content, the system further comprising an audio interface for playing an audio clip concurrently with displaying a preview of the associated content.

26. The system of claim 25, further comprising playing the audio clip at a lower than normal volume.

27. The system of claim 22, wherein the associated content comprises video content and displaying a preview of the associated content comprises displaying an image from the video clip as a still image.

28. The system of claim 22, wherein the associated content comprises video content and displaying a preview of the associated content comprises displaying a video clip.

29. The system of claim 28, wherein the video clip and the user interface controls are displayed to the user on a single display device.

30. The system of claim 28, wherein the video clip is displayed to the user on a television monitor and the user interface controls are displayed to the user on a separate device.

31. The system of claim 28, further comprising displaying the video clip at a lower than normal brightness or contrast or both.

* * * * *